United States Patent
Henson et al.

(10) Patent No.: US 12,427,960 B2
(45) Date of Patent: Sep. 30, 2025

(54) METHOD OF WHEEL SPEED SENSOR RATIONALIZATION WITH A LONGITUDINAL ACCELEROMETER

(71) Applicant: FCA US LLC, Auburn Hills, MI (US)

(72) Inventors: Scott E Henson, Chelsea, MI (US);
Stephanie R Beck, Pinckney, MI (US);
Roger C Sager, Munith, MI (US);
Anthony N Gorney, Oxford, MI (US);
Mohammed N Akhtar, Canton, MI (US)

(73) Assignee: FCA US LLC., Auburn Hills, MI (US)

( * ) Notice: Subject to any disclaimer, the term of this patent is extended or adjusted under 35 U.S.C. 154(b) by 181 days.

(21) Appl. No.: 18/344,493

(22) Filed: Jun. 29, 2023

(65) Prior Publication Data
US 2025/0001985 A1  Jan. 2, 2025

(51) Int. Cl.
*B60T 8/88* (2006.01)
*G01P 21/02* (2006.01)

(52) U.S. Cl.
CPC .............. *B60T 8/885* (2013.01); *G01P 21/02* (2013.01); *B60T 2270/416* (2013.01); *B60W 2420/503* (2013.01); *B60W 2520/105* (2013.01); *B60W 2520/28* (2013.01); *B60Y 2400/3032* (2013.01)

(58) Field of Classification Search
CPC ...... B60T 8/88; B60T 8/885; B60T 2270/416; B60W 2420/50; B60W 2420/503; B60W 2420/506; B60W 2520/105; B60W 2520/28; B60Y 2400/3032; G01P 21/00; G01P 21/02; G05D 1/0061; G05D 1/0088; G05D 1/021; G05D 1/0214; G05D 1/0221; G05D 1/0223
See application file for complete search history.

(56) References Cited

U.S. PATENT DOCUMENTS 6,295,489 B1 * 9/2001 Otsuka .................... B60T 8/885
701/33.9

FOREIGN PATENT DOCUMENTS

| CN | 108820043 B | * | 6/2021 | .......... B62D 15/029 |
| JP | 2013244802 A | * | 12/2013 | |
| JP | 2014069712 A | * | 4/2014 | |

OTHER PUBLICATIONS

Matsubayashi, JP 2013-244802, machine translation. (Year: 2013).*
Ishida, JP 2014-069712, machine translation. (Year: 2014).*
Gong, CN 108820043, machine translation. (Year: 2021).*

* cited by examiner

*Primary Examiner* — Phutthiwat Wongwian
*Assistant Examiner* — Mark L. Greene
(74) *Attorney, Agent, or Firm* — Jeremy J. Klobucar

(57) ABSTRACT

A method of rationalizing operation of a vehicle wheel speed sensor is provided. The method includes the steps of receiving an output signal from a longitudinal accelerometer, receiving an output signal from a wheel speed sensor, determining whether an acceleration event exists based on the output signal from the longitudinal accelerometer, evaluating the wheel speed sensor output signal during the acceleration event, and determining whether the wheel speed sensor signal exceeds a set threshold value during the acceleration event.

18 Claims, 3 Drawing Sheets

METHOD OF WHEEL SPEED SENSOR RATIONALIZATION WITH A LONGITUDINAL ACCELEROMETER

FIELD

The present disclosure relates to a method of rationalizing vehicle sensors and, more particularly, rationalizing a wheel speed sensor with a longitudinal accelerometer.

BACKGROUND

Vehicles include a propulsion system that drives the vehicle wheels, resulting in vehicle acceleration. Vehicle speed and acceleration may be measured by sensors and the data generated by the sensors may be provided to one or more vehicle systems. A need exists to rationalize or verify the operational status of the sensors to ensure the sensors are functioning properly.

SUMMARY

In at least some implementations, a method of rationalizing a vehicle wheel speed sensor includes the steps of:
- receiving an output signal from a longitudinal accelerometer;
- receiving an output signal from a wheel speed sensor;
- determining whether an acceleration event exists based on the output signal from the longitudinal accelerometer;
- evaluating the wheel speed sensor output signal during the acceleration event; and
- determining whether the wheel speed sensor signal exceeds a set threshold value during the acceleration event.

In at least some implementations, the control system is configured to continuously and simultaneously receive and record output signals from both the wheel speed sensor and longitudinal accelerometer while the vehicle is moving.

In at least some implementations, the set threshold is zero. In at least some implementations, the set threshold is greater than zero by a nominal noise value for the wheel speed sensor output. In at least some implementations, the set threshold does not vary as a function of the magnitude of the output of the accelerometer.

In at least some implementations, an acceleration event exists when the output signal from the longitudinal accelerometer meets or exceeds one or more acceleration thresholds.

In at least some implementations, the one or more acceleration thresholds includes a first threshold that is a magnitude of acceleration threshold and a second threshold that is a time threshold. In at least some implementations, the one or more acceleration thresholds includes a first threshold that is a magnitude of acceleration threshold and a second threshold that is a change in acceleration magnitude.

In at least some implementations, a first wheel speed sensor signal value and a second wheel speed sensor signal value from the wheel speed sensor are taken when each of the one or more acceleration thresholds are met. In at least some implementations, the step of determining whether the wheel speed sensor signal exceeds a set threshold value is accomplished by determining a difference between the first wheel speed sensor signal value and the second wheel speed sensor signal value. In at least some implementations, the wheel speed sensor is determined to be malfunctioning if the difference between the first wheel speed sensor signal value and the second wheel speed sensor signal value is zero.

In at least some implementations, the wheel speed sensor is determined to not be malfunctioning if the difference between the first wheel speed sensor signal value and the second wheel speed sensor signal value is not zero.

In at least some implementations, the method also includes a step of providing an indication of an error when the wheel speed sensor signal does not exceed the set threshold during the acceleration event. In at least some implementations, the indication of an error includes incrementing a fail counter. In at least some implementations, the indication of an error also includes providing an output in the vehicle indicating that the wheel speed sensor is malfunctioning when the fail counter meets a fail counter threshold.

In at least some implementations, a vehicle system includes a longitudinal accelerometer, a wheel speed sensor, and a controller. The longitudinal accelerometer is adapted to sense an acceleration of a vehicle and to provide an output signal indicative of the magnitude of vehicle acceleration. The wheel speed sensor is adapted to sense a wheel speed and to provide an output signal indicative of the magnitude of wheel speed. The controller communicatively coupled with the longitudinal accelerometer and the wheel speed sensor. And the controller is adapted to receive an output signal from the longitudinal accelerometer, receive an output signal from the wheel speed sensor, determine whether an acceleration event exists that meets two acceleration thresholds based on the output signal from the longitudinal accelerometer, evaluate the wheel speed sensor output signal during the acceleration event, and determine whether the wheel speed sensor signal is a non-zero value during the acceleration event.

In at least some implementations, the vehicle includes multiple wheels and a separate wheel speed sensor is provided for each wheel of the vehicle. In at least some implementations, the non-zero value is a set threshold greater than zero but which does not vary as a function of the magnitude of the output of the accelerometer.

With the methods and systems set forth herein the operation of a wheel speed sensor can be determined simply, and without having to verify that the output values from the wheel speed sensor are accurate with regard to the output from an accelerometer. A common failure mode of wheel speed sensors results in the sensor providing no output, which may be a zero value output. Typically, if a wheel speed sensor is operating and providing some determinable output, it is functioning as intended with a suitable accuracy. In view of this, the functioning of a wheel speed sensor can be checked when an acceleration event above one or more thresholds has occurred. The magnitude of the acceleration threshold(s) may be set to ensure that the output from the wheel speed sensor is clearly distinguishable from noise or other low-level interference which may, for example, make it seem like the wheel speed sensor is providing some output when it is actually not providing an output or is providing a zero output value.

Further areas of applicability of the present disclosure will become apparent from the detailed description, claims and drawings provided hereinafter. It should be understood that the summary and detailed description, including the disclosed embodiments and drawings, are merely exemplary in nature intended for purposes of illustration only and are not intended to limit the scope of the invention, its application or use. Thus, variations that do not depart from the gist of the disclosure are intended to be within the scope of the invention.

DETAILED DESCRIPTION

Figure 1:
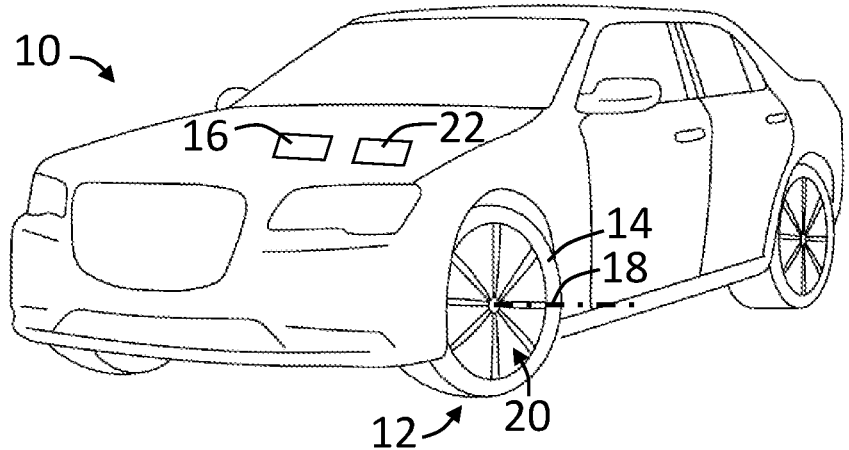
FIG. 1 is a perspective view of a vehicle.

Referring in more detail to the drawings, FIG. 1 illustrates a vehicle 10 that includes multiple wheels 12, and a propulsion system 16 including a motor, an engine, and/or a transmission that provides torque to the wheels 12 to rotate the wheels about an axis of rotation 18 and accelerate the vehicle 10. The vehicle 10 may also include a brake or brake assembly 20 to decelerate the vehicle 10. Vehicle acceleration may be determined by one or more wheel speed sensors 28 (FIG. 2) and/or a longitudinal accelerometer 30. These sensors, among other things, may be communicatively coupled with a controller 22 or control system (e.g., an engine control module). The controller 22 and sensors 28, 30 may be used in control of one or move vehicle functions or systems, like anti-lock brakes, vehicle stability control and the like. The controller 22 may be arranged to receive sensor information and provide information to another system to, for example, trigger diagnostic fault codes for a user in the event of a malfunction of a vehicle component or system (e.g., a malfunctioning vehicle wheel speed sensor or longitudinal accelerometer). The controller 22 may include a memory 24 for storing data from the one or more sensors and a processor 26 for processing the data stored in the memory.

In order to perform the functions and desired processing set forth herein, as well as the computations therefore, the controller 22 may include, but not be limited to, a processor(s), computer(s), DSP(s), memory, storage, register(s), timing, interrupt(s), communication interface(s), and input/output signal interfaces, and the like, as well as combinations comprising at least one of the foregoing. For example, controller 22 may include input signal processing and filtering to enable accurate sampling and conversion or acquisitions of such signals from communications interfaces and sensors. As used herein the terms controller 22 may refer to one or more processing circuits such as an application specific integrated circuit (ASIC), an electronic circuit, a processor (shared, dedicated, or group) and memory that executes one or more software or firmware programs, a combinational logic circuit, and/or other suitable components that provide the described functionality.

Figure 2:
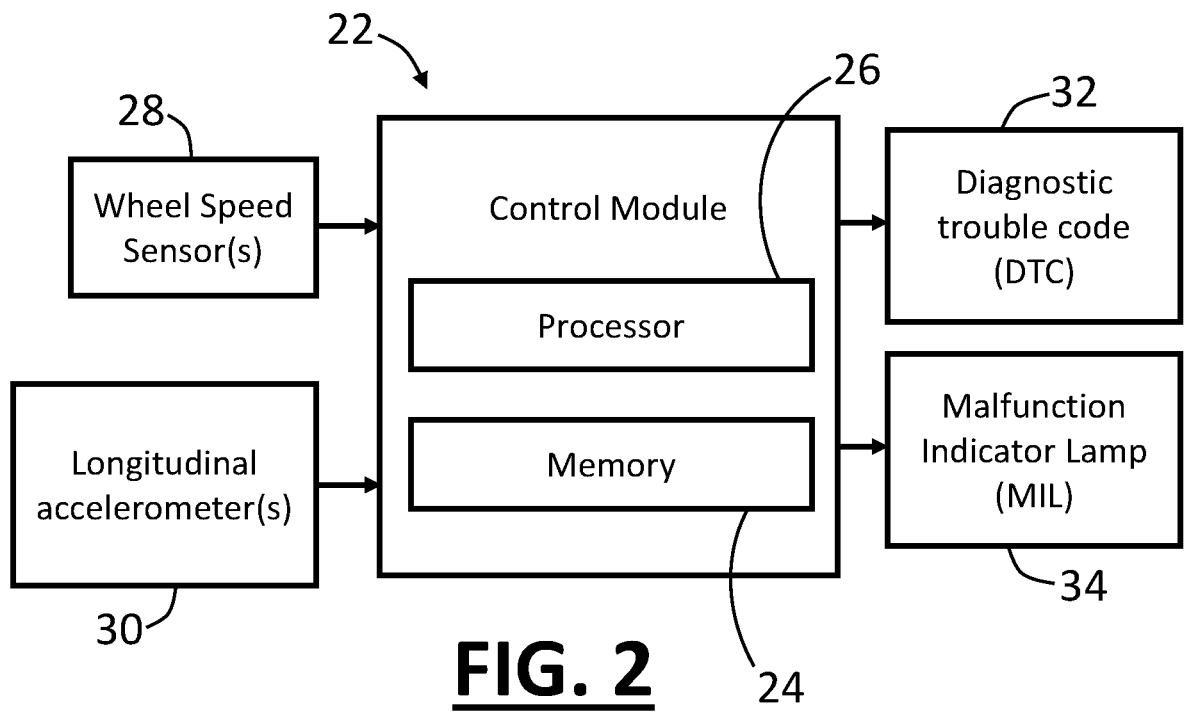
FIG. 2 is a schematic diagram of a control system of the vehicle.

As shown in FIG. 2, to permit measurement of the rotational speed of the wheels 12, the wheel speed sensor 28 may be associated with one of the wheels 12 to provide an output to the controller 22 that is indicative of the rotation of the wheel. The wheel speed sensor 28 may measure rotational speed, acceleration, or both. A separate wheel speed sensor 28 may be associated with each wheel 12. Further, acceleration may be determined by the derivative of rotary speed output(s) from the sensor 28. By way of a non-limiting example, the wheel speed sensor 28 may be a hall effect sensor with a magnet being rotated with the wheel or spindle and with a sensing element used to detect the magnet as it rotates by the sensing element. Of course, other types of rotational speed sensors may be used.

Additionally, acceleration may be measured using a longitudinal accelerometer sensor 30 which measures gravitational forces (i.e., g-forces) in forward and reverse directions. In at least one embodiment, the longitudinal accelerometer sensor 30 may be a multi-axis accelerometer which provides simultaneous measurement of acceleration in three perpendicular axes, for example. The longitudinal accelerometer 30 may measure normal acceleration which arises when torque is transferred from the propulsion system 16 to the wheels 12 and may also detect decelerating braking forces that arise when the brakes 20 of the vehicle are applied or during engine braking, for example.

One or more systems of vehicle 10 may rely on the wheel speed and vehicle acceleration data from the wheel speed sensor 28 and longitudinal accelerometer sensor 30 during operation or during travel of the vehicle 10. Some systems may be on-board the vehicle and some systems may be remote from the vehicle. For instance, anti-lock braking system (ABS), on-board diagnostic monitors (OBD), torque security features, and/or autonomous vehicle systems (AVS) may utilize some or all of the data from the wheel speed sensor 28 and/or the longitudinal accelerometer 30.

In the event of a malfunction of the wheel speed sensor 28 or longitudinal accelerometer 30, the controller 22 may be configured to send or initiate diagnostic trouble codes (DTC) 32 so that a service technician can identify and diagnosis a specific issue. The controller may additionally, or in the alternative, be configured illuminate a malfunction indicator lamp (MIL) 34 to help indicate a malfunction to a user.

Rationalization of wheel speed sensor 28 with the longitudinal accelerometer 30 may be performed on one or more and up to all wheel speed sensors 28 of the vehicle 10. In general, rationalization may confirm whether the wheel speed sensor(s) 28 are providing some non-zero output signal, as a predominant failure mode of wheel speed sensors 28 is a total failure in which the sensor provides only a zero-output signal, suggesting no wheel rotation is occurring even when the associated wheel 12 is rotating. As set forth herein, the rationalization process and method set forth herein may be used as an easy way to determine that the wheel speed sensor 28 is providing a signal without having to determine if the qualitative data from the wheel speed sensor 28 is the same as that provided from the longitudinal accelerometer 30. In other words, determining whether the value or magnitude of the wheel speed sensor output is accurate with respect to the longitudinal accelerometer output is unnecessary. Instead, an easy and economical manner to determine the most common fault or failure mode of wheel speed sensors 28 may involve configuring the controller 22 to require some output from the wheel speed sensor 28 when there is a sufficient non-zero output from the longitudinal accelerometer 30.

The controller 22 may continuously and simultaneously receive and record data from both the wheel speed sensor 28 and longitudinal accelerometer 30 while the vehicle 10 is moving as well as while the vehicle 10 is at rest. Electrical noise and vibrations, for example, may cause the wheel speed sensor 28 and/or the longitudinal accelerometer 30 to produce output signals at the controller 22 which in theory could result in a false indication of a wheel speed sensor failure. To ensure that diagnostic evaluation of the wheel speed sensor 28 is robust, it may be desirable to configure the controller 22 to only assess and diagnose the wheel speed sensor 28 when the longitudinal accelerometer output signals are of such a magnitude that some response output signal is expected from the wheel speed sensor 28 that is clearly distinguishable from a zero-output signal.

In at least some implementations, one or more longitudinal accelerometer thresholds may be used to ensure a sufficient acceleration event exists. For example, in FIG. 3, a first acceleration threshold 36 which may relate to a minimum magnitude of acceleration, and a second acceleration threshold 38, which may be a time threshold, are used to determine whether a sufficient acceleration event exists for use in determining operation of a wheel speed sensor. In this example, if the magnitude of an output signal 40 of the longitudinal accelerometer 30 is greater than the acceleration threshold 36 for a period of time equal to or greater than the time threshold 38, then a sufficient acceleration event exists and the controller 22 will be enabled to evaluate whether the wheel speed sensor 28 has provided a response at an expected magnitude which may be a third, response magnitude, as set forth in more detail below.

Figure 4:
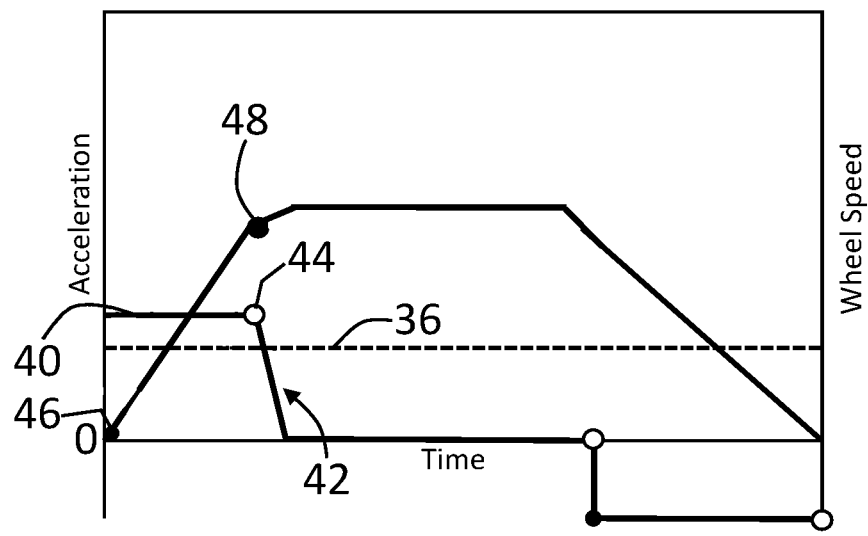
FIG. 4 is another graph of acceleration and wheel speed over time.

Instead of using the time threshold 38, FIG. 4 shows that the controller 22 may be configured to require an output 40 from the accelerometer 30 that is greater than the first acceleration threshold 36 and a second acceleration threshold or condition, indicated at 42, which may be a change in the output from the accelerometer, indicating either an increase or decrease in acceleration. This change in acceleration may be a second acceleration threshold 42 or condition to be met before the wheel speed output is checked, and may be determined by an inflection point 44 in the acceleration output data. The second acceleration threshold or condition may be used to ensure that the longitudinal accelerometer 30 is not stuck (i.e., malfunctioning) and producing a static non-zero value above the acceleration threshold 36 that does not represent actual vehicle acceleration. A change in the accelerometer output 40 indicates that the accelerometer is not stuck and is operating correctly.

Figure 3:
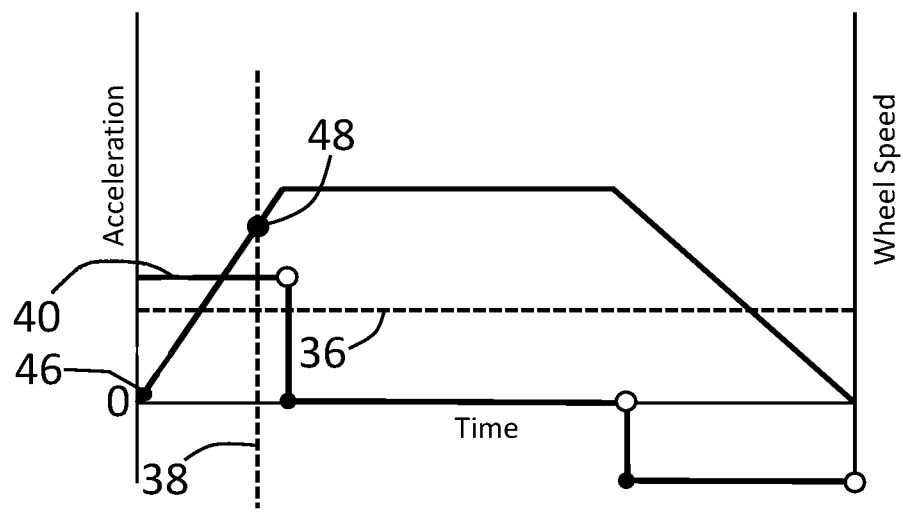
FIG. 3 is a graph of acceleration and wheel speed over time.

As noted above, the controller 22 may be configured to simultaneously receive and/or record the outputs from the wheel speed sensor(s) 28 and the accelerometer 30. To check operation of the wheel speed sensor 28, the controller 22 may be configured to record a first wheel speed sensor signal value 46 when the first acceleration threshold 36 is met and a second wheel speed value 48 when the second acceleration threshold 38 or 42 is met. In the example of FIG. 3, the first wheel speed sensor signal value 46 is taken when the accelerometer output signal 40 is equal to or greater than the first acceleration threshold 36, which indicates a sufficient magnitude of acceleration has occurred. Thereafter, a second wheel speed sensor signal value 48 is taken when the second acceleration threshold 38 has been met. In this example, this means that the accelerometer output 40 was equal to or greater than the first acceleration threshold for a period of time at least equal to the time period designated as the second acceleration threshold 38. In this example, after the two acceleration thresholds 36, 38 are met, it is determined that a sufficient acceleration event occurred and then the first and second wheel speed sensor signal values 46, 48 can be evaluated to determine whether the output from the wheel speed sensor 28 satisfies one or more conditions. In one example, the condition may simply be that neither value 46 or 48 is zero or below a threshold magnitude. In one example, a different between the values 46 and 48 may be evaluated to determine if the difference in wheel speed signals is greater than a threshold magnitude. If the first and second wheel speed sensor signal values 46, 48 are evaluated and the result is a zero signal value during the acceleration event, or that the signal values 46, 48 do not meet the threshold magnitude set, then a malfunction in the wheel speed sensor 28 may be present.

In the example of FIG. 4, the first wheel speed sensor signal value 46 is taken when the accelerometer output signal 40 is equal to or greater than the first acceleration threshold 36, which indicates a sufficient magnitude of acceleration has occurred. Thereafter, a second wheel speed sensor signal value 48 is taken when the second acceleration threshold 42 has been met, which is a change in the accelerometer output 40 indicating a change in the rate of acceleration of the vehicle 10. The wheel speed sensor signal values 46, 48 may be evaluated as described with reference to FIG. 3.

Figure 5:
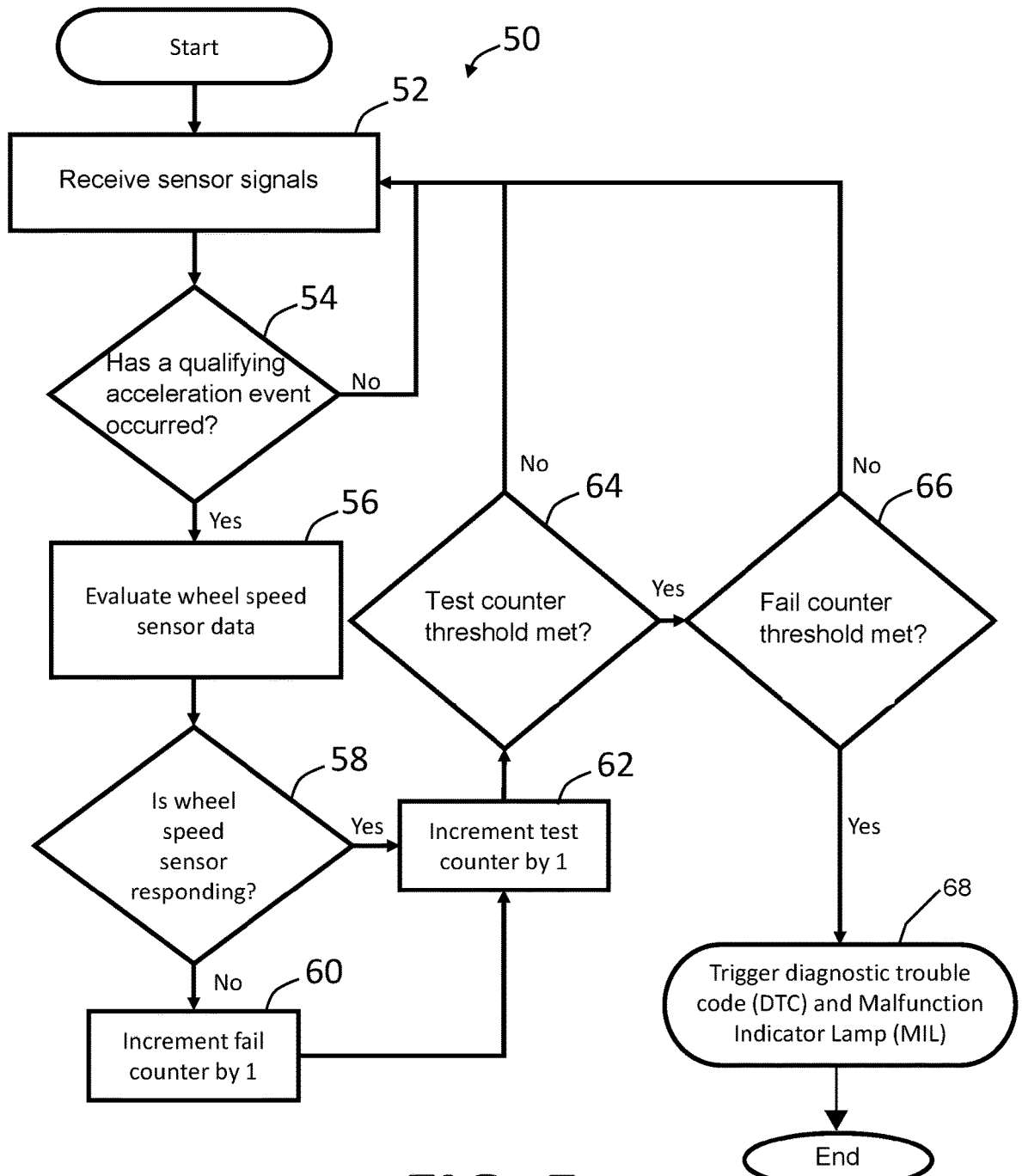
FIG. 5 is a is a flow chart of a method of rationalizing a wheel speed sensor with a longitudinal accelerometer.

FIG. 5 is a flowchart of a method 50 for rationalizing performance of the wheel speed sensor 28 with the longitudinal accelerometer 30. The method 50 begins with step 52 where output signals from the one or more wheel speed sensors 28 and the longitudinal accelerometer 30 may be provided to and received at the controller 22. The longitudinal accelerometer output signal may be received at the controller 22 as an input signal and the wheel speed sensor output signal may be received at the controller 22 as a response signal.

In step 54 of method 50, depending on how the controller 22 is configured, the controller 22 may evaluate the signals received and determine whether a sufficient acceleration event has occurred. This may be done as described with reference to FIGS. 3 and 4, and with regard to one or more acceleration thresholds. If it is determined that a qualifying acceleration event has not occurred, for example because the first acceleration threshold was met but the second acceleration threshold was not met, then in step 54 the method returns to step 52 and the controller 22 will continue to receive data from the wheel speed sensor 28 and longitudinal accelerometer 30 until a sufficient acceleration event has occurred at which time the method continues to step 56.

In step 56, the controller 22 assesses the wheel speed sensor signal data, such as the first and second wheel speed sensor signal values 46, 48 that correspond with when the acceleration thresholds were met. After evaluating the wheel speed sensor signal data, the method 50 may continue to step 58 in which the controller 22 determines whether the wheel speed sensor is responding properly in light of the acceleration event. This determination may be made, for example, if one or both of the sensor signals 46, 48 is above a threshold value, if the difference between the sensor signals 46, 48 is above a threshold value, or if one or both of the sensor signals 46, 48 is not a zero value. In at least some examples, the threshold value may be a function of the typical noise or expected accuracy of the wheel speed sensor 28, which is some nominal value greater than zero so that a very low signal value cause by system noise or the like is not mistaken for a positive output from the wheel spend sensor when it is actually providing a zero output value. The threshold value may be a set value and not related to the magnitude of acceleration that occurs during an acceleration event. In other words, the threshold value may remain the same and be used to check operation of the wheel speed sensor in acceleration events of varying magnitude. In this way, the accuracy of the output of the wheel speed sensor 28 is not be tested, and what is being tested is whether the wheel speed sensor is operating and providing a non-zero output.

If in step 56 the signal data does not meet the threshold value (e.g. is not equal to or greater than the threshold, or greater than zero), then the method continues to step 60 and a "fail counter" is incremented by one as a result of the wheel speed sensor data not meeting the threshold. The method then continues to step 62 in which a "test counter" is incremented by one indicating completion of a first test of the wheel speed sensor. If, on the other hand, the value found in step 56 satisfies the threshold, then the wheel speed sensor is determined to be functioning properly and the method 50 proceeds directly to step 62 where only the test counter is incremented by one indicating completion of a successful test.

The controller 22 may be programmed to include a test count threshold that must be met (e.g., 2 to 10, by way of non-limiting examples) before the fail counter is evaluated to determine whether a malfunction of the wheel speed sensor 28 exists. This can be done to ensure that a desired number of tests have been completed to provide greater confidence in the result. The method 50 may continue to step 64, in which it is determined if the test counter threshold has been met. If this threshold has not been met then the method returns to step 52 to begin another test. If the test counter threshold has been met, then that indicates that there is sufficient data for the controller 22 to make a determination as to the operation of the wheel speed sensor 28 and the method continues to step 66.

In step 66, the controller 22 checks the fail counter against a fail counter threshold to determine if a sufficient number of tests indicating failure of the wheel speed sensor 28 has occurred to determine that the wheel speed sensor is not functioning or is not functioning properly. This may be desirable ensure that the method 50 is robust and only indicates a malfunction when multiple tests indicate sensor malfunction. If, in step 66, the fail counter does not exceed the fail counter threshold then the controller 22 determines that the wheel speed sensor is not malfunctioning and the method 50 returns to step 52 to start a new sequence of tests, if desired, or the method may termination. If, in step 66, the fail counter exceeds the fail counter threshold then the method continues to step 68 in which an error is indicated, such as a diagnostic trouble code 32 (DTC) or illumination of a corresponding malfunction indicator lamp 34. The DTC 32 may be an error code which may be read by a service technician and the malfunction indicator lamp 34 (e.g., check engine light) may be provided to indicate to a user that the vehicle 10 needs to be serviced. The fail counter threshold may be set at any desired level relative to the test counter threshold. For example, if the test counter threshold is set to 10, then the fail counter threshold may be 10 or a number less than 10. In at least some implementations, the fail counter threshold value is 100% of the test counter threshold value over the course of at least 3 to 5 tests per vehicle trip, for example.

Of course, a test counter and/or fail counter is not needed and a single malfunction of a wheel speed sensor 28 may cause an error to be indicated by the system, if desired. Further, the test and fail counters may be reset at any desired interval, including when the vehicle 10 is shutdown after use, or at any other time such as after a threshold number of tests have been run without a threshold number of failures being indicated. For example. the counter may be reset during any conditions other than a key cycle. A "key cycle" refers to an engine/vehicle key-on followed by an engine// vehicle key-off. Also, the method 50 may be run at any desired frequency or interval, as the vehicle 10 is being used, as desired. For instance, the method 50 may run at least once per trip and evaluate the operation of the wheel speed sensor 28 if the acceleration threshold conditions are met.

What is claimed is:

1. A method of rationalizing a vehicle wheel speed sensor, the method comprising the steps of:

receiving an output signal from a longitudinal accelerometer;

receiving an output signal from a wheel speed sensor;

determining whether an acceleration event exists based on the output signal from the longitudinal accelerometer, wherein an acceleration event exists when the output signal from the longitudinal accelerometer meets or exceeds one or more acceleration thresholds;

evaluating the wheel speed sensor output signal during the acceleration event;

determining whether the wheel speed sensor output signal exceeds a set threshold value during the acceleration event; and sending an indication of an error detectable in a vehicle including the wheel speed sensor when the wheel speed sensor output signal does not exceed the set threshold value.

2. The method of claim 1, further comprising, via a control system, continuously and simultaneously receiving and recording output signals from both the wheel speed sensor and longitudinal accelerometer while the vehicle is moving.

3. The method of claim 1, wherein the set threshold value is zero.

4. The method of claim 1, wherein the one or more acceleration thresholds includes a first threshold that is a magnitude of acceleration threshold and a second threshold that is a time threshold.

5. The method of claim 1, wherein the one or more acceleration thresholds includes a first threshold that is a magnitude of acceleration threshold and a second threshold that is a change in acceleration magnitude.

6. The method of claim 1, wherein a first wheel speed sensor signal value and a second wheel speed sensor signal value from the wheel speed sensor are taken when each of the one or more acceleration thresholds are met.

7. The method of claim 6, wherein the step of determining whether the wheel speed sensor output signal exceeds a set threshold value is accomplished by determining a difference between the first wheel speed sensor signal value and the second wheel speed sensor signal value.

8. The method of claim 7, wherein the wheel speed sensor is determined to be malfunctioning if the difference between the first wheel speed sensor signal value and the second wheel speed sensor signal value is zero.

9. The method of claim 7, wherein the wheel speed sensor is determined to not be malfunctioning if the difference between the first wheel speed sensor signal value and the second wheel speed sensor signal value is not zero.

10. The method of claim 1, further comprising a step of providing an indication of an error when the wheel speed sensor signal does not exceed the set threshold value during the acceleration event.

11. The method of claim 10 wherein the indication of an error includes incrementing a fail counter.

12. The method of claim 11 wherein the indication of an error also includes providing an output in the vehicle indicating that the wheel speed sensor is malfunctioning when the fail counter meets a fail counter threshold.

13. The method of claim 1, wherein the set threshold value is greater than zero by a nominal noise value for the wheel speed sensor output signal.

14. The method of claim 1, wherein the set threshold value does not vary as a function of the magnitude of the output signal of the accelerometer.

15. The method of claim 1 wherein the step of sending an indication of an error is accomplished by one or both of initiating one or more diagnostic trouble codes or illuminating a malfunction indicator lamp.

16. A vehicle system, comprising:
   a longitudinal accelerometer adapted to sense an acceleration of a vehicle and to provide an output signal indicative of the magnitude of vehicle acceleration;
   a wheel speed sensor adapted to sense a wheel speed and to provide an output signal indicative of the magnitude of wheel speed; and
   a controller communicatively coupled with the longitudinal accelerometer and the wheel speed sensor and adapted to:
   receive an output signal from the longitudinal accelerometer;
   receive an output signal from the wheel speed sensor;
   determine whether an acceleration event exists that meets two acceleration thresholds based on the output signal from the longitudinal accelerometer;
   evaluate the wheel speed sensor output signal during the acceleration event;
   determine whether the wheel speed sensor signal is a non-zero value during the acceleration event; and
   sending an indication of an error detectable in a vehicle including the wheel speed sensor when the wheel speed sensor signal is not a non-zero value during the acceleration event.

17. The system of claim 16, wherein the vehicle includes multiple wheels and a separate wheel speed sensor is provided for each wheel of the vehicle.

18. The system of claim 16 wherein the non-zero value is a set threshold greater than zero but which does not vary as a function of the magnitude of the output signal of the accelerometer.

* * * * *